United States Patent [19]

Ichikawa

[11] Patent Number: 5,191,362
[45] Date of Patent: Mar. 2, 1993

[54] ELECTROPHOTOGRAPHIC PRINTING APPARATUS WITH A CONTROL SYSTEM RESPONSIVE TO TEMPERATURE CHANGES

[75] Inventor: Toshiyuki Ichikawa, Numazu, Japan

[73] Assignee: Tokyo Electric Co., Ltd., Tokyo, Japan

[21] Appl. No.: 657,851

[22] Filed: Feb. 19, 1991

[30] Foreign Application Priority Data

Feb. 21, 1990 [JP] Japan .................................. 2-38469

[51] Int. Cl.⁵ ...................... G03B 27/52; G03G 21/00
[52] U.S. Cl. .................................. 346/160; 346/108; 355/30; 355/246
[58] Field of Search ........................ 355/30, 35, 246; 346/153.1, 160, 108

[56] References Cited

U.S. PATENT DOCUMENTS

| | | | |
|---|---|---|---|
| 3,814,516 | 6/1974 | Whited | 355/246 |
| 3,981,268 | 9/1976 | Tsukamoto et al. | 355/246 X |
| 4,508,446 | 4/1985 | Imai | 355/246 X |
| 4,713,672 | 12/1987 | Horihata et al. | 346/108 |
| 4,725,854 | 2/1988 | Ohtsuka et al. | 346/108 |
| 4,876,556 | 10/1989 | Ohara | 346/108 |
| 4,888,618 | 12/1989 | Ishikawa | 355/246 X |
| 5,019,862 | 5/1991 | Nakamura et al. | 355/211 X |
| 5,041,865 | 8/1991 | Asano et al. | 355/30 |
| 5,060,022 | 10/1991 | Yoshida et al. | 355/246 |

FOREIGN PATENT DOCUMENTS

60-83971  5/1985  Japan .
61-190348 8/1986 Japan .

Primary Examiner—A. T. Grimley
Assistant Examiner—Nestor R. Ramirez
Attorney, Agent, or Firm—Frishauf, Holtz, Goodman & Woodward

[57] ABSTRACT

An electrophotographic printing apparatus comprises an electrifying unit for electrifying a surface of a photosensitive drum, an exposing unit for selectively exposing the photosensitive drum to form an electrostatic latent image, a developing unit for developing the electrostatic latent image, a transferring unit for transferring the developed image to a paper sheet, a deelectrifying unit for removing unnecessary charges left on the surface of the photosensitive drum after the image transfer, thereby enabling the surface to be electrified again. The printing apparatus further comprises a thermal sensor for measuring an environmental temperature of the photosensitive drum, and a control circuit for detecting to which one of a plurality of continuous temperature ranges, the measured temperature belongs, and for controlling the exposing unit such that the amount of exposure is decreases as the detected temperature range increases, and for controlling the developing unit such that the amount of a developer being fed is decreased as the measured temperature increases within the detected temperature range.

7 Claims, 6 Drawing Sheets

ELECTROPHOTOGRAPHIC PRINTING APPARATUS WITH A CONTROL SYSTEM RESPONSIVE TO TEMPERATURE CHANGES

BACKGROUND OF THE INVENTION

1. Field of the Invention

The present invention relates to an electrophotographic printing apparatus having a photosensitive member electrified in a printing operation, and more particularly to an electrophotographic printing apparatus wherein unnecessary electrical charges are removed from the photosensitive member before the next printing operation.

2. Description of the Related Art

In the general electrophotographic printing apparatus, the surface of a photosensitive member, which is formed of photoconductive material, is evenly electrified and selectively exposed by light radiated in accordance with input image data. Thus an electrostatic latent image is formed on the surface of the photosensitive member. Then, toner, which adheres to the surface of the photosensitive member in accordance with the electrostatic latent image, is fed to the surface of the photosensitive surface, so that the electrostatic latent image is developed. Then, a sheet of paper is charged and a toner image is transferred to the sheet of paper from the surface of the photosensitive member by electrostatic attraction. After the image transfer, the toner image is fixed to the paper sheet by heat and pressure, and the paper is discharged. On the other hand, the photosensitive member is processed to remove toner which withstands the electrostatic attraction and remains on the surface. The photosensitive member then processed to remove unnecessary electrical charges.

An EEH (edge emitter array head) type electrophotographic printing apparatus comprises a line head positioned in the vicinity of the photosensitive member and has an array of edge light-emitting elements arranged by one row. The photosensitive member is exposed for one line each time these light-emitting elements are selectively driven. The light-emitting element is formed of a light-emitting diode, a semiconductor laser, or an EL (electroluminescence) element, for example. The light-emitting diode and the semiconductor laser have an output characteristic which depends on the environmental temperature. Therefore, the light-emitting diode and the semiconductor laser are controlled in accordance with the change of the environmental temperature so as to keep the output constant in the printing operation. However, such a control is not effected in the EL element, whose an output characteristic does not substantially depend on the environmental temperature.

In the conventional electrophotographic printing apparatus, even if the output of the light-emitting elements is not changed, the printing quality can still deteriorate. This deterioration of the printing quality is caused by the change is deelectrification efficiency caused by the environmental temperature of the photosensitive member. For example, when the environmental temperature of the photosensitive member is low, necessary electrical charges are not completely removed from the photosensitive member. Due to this, the potential of the deelectrified photosensitive member is increased, and the sensitivity of the photosensitive member is decreased. Because of the decrease in sensitivity of the photosensitive member, the line elements of the electrostatic latent image to be drawn on the surface of the photosensitive member become thinner and the printed characters and drawings thus become unclear.

SUMMARY OF THE INVENTION

An object of the present invention is to provide an electrophotographic printing apparatus wherein excellent printing quality can be maintained even if the environmental temperature of the photosensitive member is changed.

The object can be achieved by an electrophotographic printing apparatus which comprises: a photosensitive member; an electrifying unit for electrifying a surface of the photosensitive member; an exposing unit for selectively exposing the electrified surface of the photosensitive member to form an electrostatic latent image; a developing unit for developing the electrostatic latent image by feeding a developer which adheres to the surface of the photosensitive member in accordance with the electrostatic latent image; a transferring unit for electrifying a sheet of paper to transfer the developed image to the paper sheet; a deelectrifying unit for removing unnecessary charges left in the surface of the photosensitive member after the image transfer, thereby enabling the surface to be electrified again; a thermal sensor for measuring the environmental temperature of the photosensitive member; and a control circuit for detecting to which one of a plurality of continuous temperature ranges the measured temperature belongs, and controlling the exposing unit such that the amount of exposure is decreased as the detected temperature range increases, controlling the developing unit such that the amount of feed is decreased as the measured temperature increases within the detected temperature range.

According to the above-structured electrophotographic printing apparatus, the environmental temperature of the photosensitive member is measured by a thermal sensor, and is detected by the control circuit to determine which one of a plurality continuous temperature ranges the measured temperature belongs. The control circuit controls the exposing unit such that the amount of exposure is decreased as the detected temperature range increases. Also, the control circuit controls the developing unit such that the amount of feed is decreased as the measured temperature increases within the detected temperature range. When the sensitivity of the photosensitive member is changed in accordance with the change of the environmental temperature, the amount of exposure of the photosensitive member is changed by the unit of the temperature range. This can largely compensate for the change of sensitivity of the photosensitive member, but cannot compensate for the change of the sensitivity in each temperature range. The amount of feed is decreased as the measured temperature increases within the detected temperature range. This control compensates for the change of the sensitivity of the photosensitive member in each temperature range, which cannot be compensated by the control of the exposing unit. Therefore, printing quality can be prevented from deteriorating the change of the environmental temperature of the photosensitive member.

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

An electrophotographic printing apparatus according to an embodiment of the present invention will be explained with reference to drawings FIGS. 1 to 12.

Figure 1:
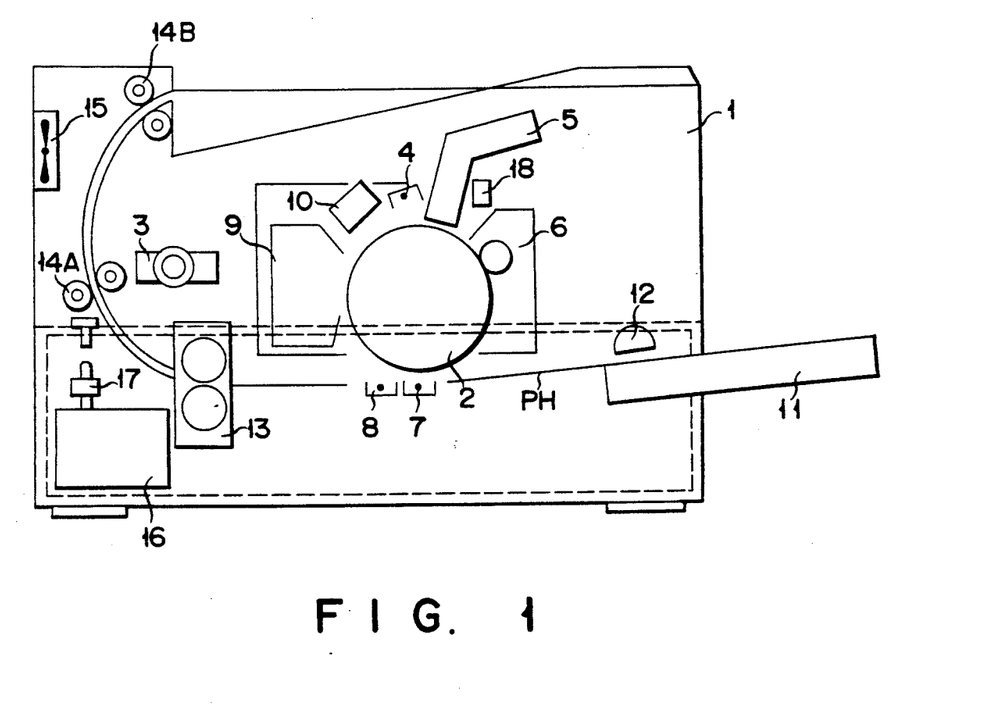
FIG. 1 is a view showing an internal structure of an electrophotographic printing apparatus according to one embodiment of the present invention.

FIG. 1 shows the internal structure of the electrophotographic printing apparatus. The electrophotographic printing apparatus comprises a cabinet 1 whose upper portion can be rocked open, a photosensitive drum 2 arranged in substantially the center of the cabinet 1 and driven to rotate in the clockwise direction, and a driving motor 3 for driving the photosensitive drum 2 and various mechanisms. Moreover, an electrifying unit 4, an exposing unit 5, a developing unit 6, a transferring unit 7, a cleaning device 9, and a deelectrifying device 10 are arranged around the photosensitive drum 2 in order to sequentially process the photosensitive drum 2 in the printing operation.

The photosensitive drum 2 has a photosensitive surface formed of photoconductive material. The electrifying unit 4 evenly electrifies the surface of the photosensitive drum 2. The exposing unit 5 selectively exposes the electrified surface of the photosensitive drum 2 by use of light radiated in accordance with input image data, thereby forming an electrostatic latent image on the surface of the photosensitive drum 2. The developing unit 6 feeds toner which adheres to the surface of the photosensitive drum 2 in accordance with the electrostatic latent image, thereby developing the electrostatic latent image. The transferring unit 7 changes a sheet of paper and transfers toner image to the paper from the surface of the photosensitive drum by electrostatic attraction. The cleaning device 9 removes toner left in the surface of the photosensitive drum 2 withstanding against electrostatic attraction after the image transfer. The deelectrifying unit 10 removes unnecessary charges from the surface of the photosensitive drum 2 after the image transfer in order to electrify the surface of the photosensitive drum 2 again.

Moreover, the electrophotographic printing apparatus comprises a deelectrifying unit 8, a paper cassette 11, a pick-up roller 12, a fixing device 13, discharging rollers 14A and 14B, a fan motor 15, a DC power supply 16, an opening detection switch 17, and a thermal sensor 18. The sheets of paper are contained in the paper cassette 11, and picked up one by one at a predetermined timing by the pick-up roller 12. The picked-up sheet is fed to the transferring unit 7 through a transport path PH. The deelectrifying unit 8 is arranged to be adjacent to the transferring unit 7, which is positioned under the photosensitive drum 2, and deelectrifies the electrified paper after being transferred by the transferring unit 7. The paper sheet is fed from the transferring unit 7 to the fixing device 13 in order to fix the toner image by heat and pressure, and then discharged to the upper surface of the cabinet 1 by the discharging rollers 14A and 14B. The discharging rollers 14A and 14B, and the pick-up roller 12 are driven by driving force of the driving motor 3. The fan motor 15 emits heat in the cabinet 1 outside. The opening detection switch 17 detects that the upper portion of the cabinet 1 is opened. The thermal sensor 18 is placed in the vicinity of the surface of the photosensitive drum 2, and detects the environmental temperature of the photosensitive drum 2.

Figure 2:
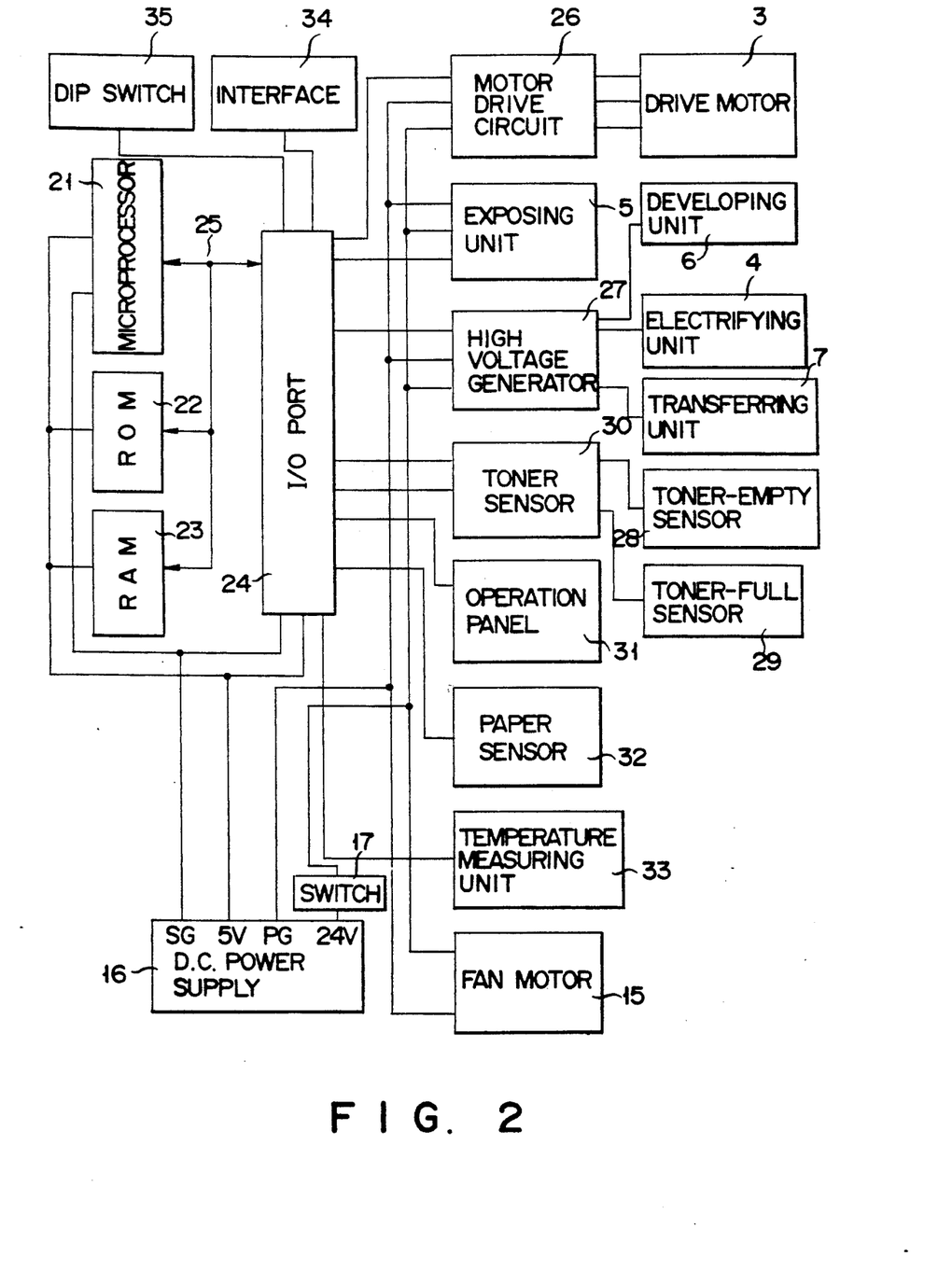
FIG. 2 is a block diagram showing a circuit structure of the electrophotographic printing apparatus.

FIG. 2 shows the circuit structure of the electrophotographic printing apparatus. As shown in FIG. 2, the printing apparatus comprises a microprocessor 21 for performing various processes necessary for the control of the printing operation, a ROM (read only memory) 22 for storing the control program of the microprocessor 12, a RAM (random access memory) 23 for temporarily storing input/output data of the microprocessor 21 including image data and various commands both supplied from the external host computer (not shown), an I/O (input/output) port 24 for peripheral circuits explained later, and a bus line 25 for interconnecting the microprocessor 21, ROM 22, RAM 23, and I/O port 24.

The I/O port 24 is connected to a motor drive circuit 26, the exposing unit 5, a high voltage generator 27, a toner sensor circuit 30, an operation panel 31, a paper sensor 32, a temperature measuring unit 33, the fan motor 15, an interface 34, and a dip switch 35. The motor drive circuit 26 drives the drive motor 3. The high voltage generator 27 applies high voltages to the electrifying unit 4, the transferring unit 7, and the developing unit 6. The toner sensor circuit 30 receives the output signals of a toner-empty, sensor 28 and a toner-full sensor 29 which are both provided in the developing unit 6. The operation panel 31 is operated to input data necessary for controlling the printing operation. The paper sensor 32 detects the position of the paper sheet as it is being transported. The temperature measuring unit 33 includes a thermal sensor 18. The opening detection switch 17 is inserted into a power source line in which power voltage of 24 V is supplied to the exposing unit 5, the motor drive circuit 26, the high voltage generator 27, and the fan motor 15 from the DC power supply 16. The power supply is cut off when the upper portion of the cabinet 1 is opened.

Figure 3:
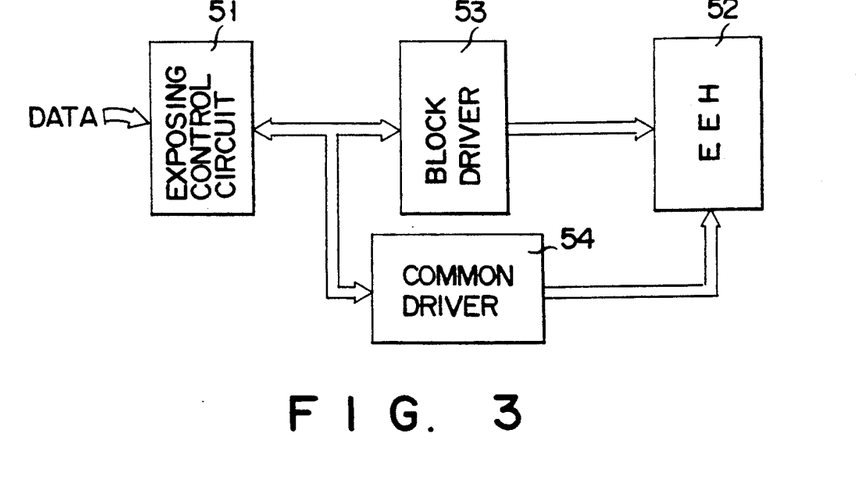
FIG. 3 is a view explaining the structure of an exposing unit shown in FIG. 2 in detail.
Figure 4:
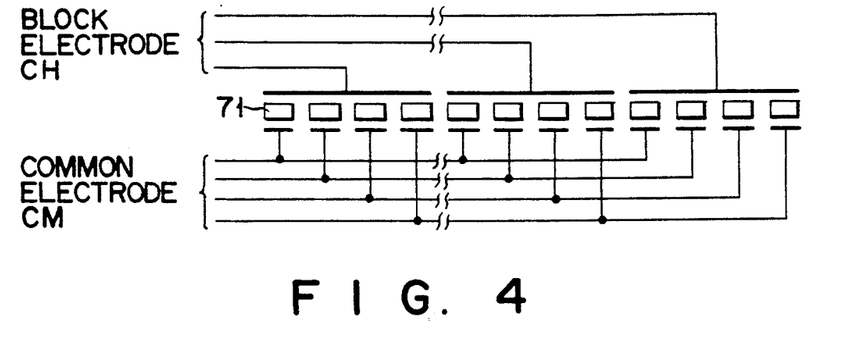
FIG. 4 is a view explaining the structure of an EEH shown in FIG. 3 in detail.
Figure 5:
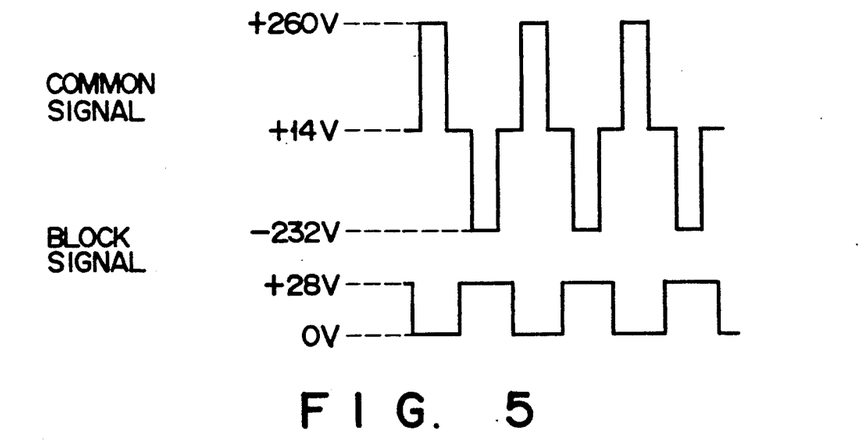
FIG. 5 is a view showing waveform of common and bock signals to be applied to EL elements shown in FIG. 4.

FIG. 3 shows the structure of the exposing unit 5 in detail. The exposing unit 5 comprises an exposing control circuit 51, an EEH (edge emitter array head) 52, a block driver 53, and a common driver 54. The exposing control circuit 51 controls the block driver 53 and the common driver 54. The block driver 53 drives EEH 52 in cooperation with the common driver 54. The EEH 52 is placed in the vicinity of the photosensitive surface of the photosensitive drum 2, and exposes the surface of the photosensitive drum 2 by a line unit. As shown in FIG. 4, The EEH 52 comprises an array of an EL (electroluminescence) elements 71 arranged in one row, block electrodes CH for receiving a block signal, and common electrode CM for receiving a common signal. Each EL element is energized when a common signal and a block signal are supplied to a corresponding common electrode and a corresponding block electrode, respectively. The common signal is an AC voltage pulse having a maximum value of +260 V and a minimum value of −232 V, and the block signal is a DC voltage pulse having an amplitude of +28 V. The EL output of the EEH 52, that is, the amount of exposure of the photosensitive drum 2, is changed by increasing and decreasing the number of AC voltage pulses of the common signal which is supplied together with the block signal.

The exposing control circuit 51 is connected to the microprocessor 21 via I/O port 24 to receive image data &or one line and data for designating the amount of exposure. Every time the circuit 51 receives these data, they are converted into exposure control data for the exposure using EEH 52. The block driver 53 sequentially supplies a block signal to the block electrodes CH of the EL elements 71, the common driver 54 supplies a common signal to the common electrodes CM of the EL elements 71 specified by the exposure controlling data while the block signal is supplied to a corresponding block electrode CH. The exposure controlling data includes pulse number designating data which corresponds to the designated amount of exposure and designates the number of AC voltage pulses to be generated from the common driver 54 for each EL element. The EL output of the EEH 52 is set to 0.2 mW, 0.25 mW, and 0.3 when the number of AC voltage pulses is two, three, and four, respectively.

Figure 6:
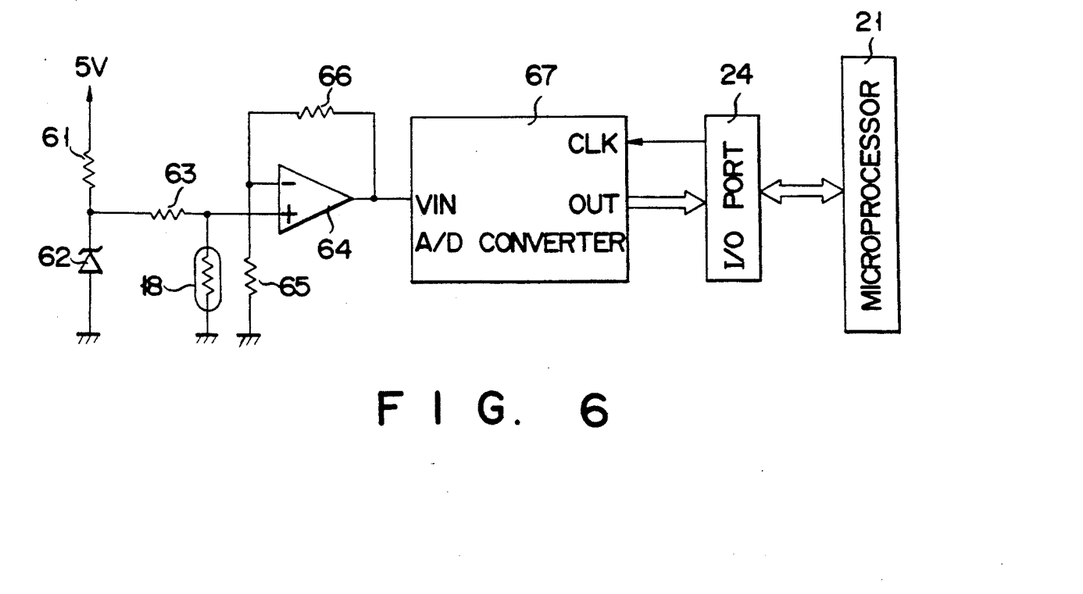
FIG. 6 is a view explaining the structure of a temperature measuring unit shown in FIG. 2 in detail.

FIG. 6 shows the structure of the temperature measuring unit 33 in detail. In the temperature measuring unit 33, a serial circuit having a resistor 61 and a Zener diode 62 is connected between power source terminals to which power voltage of 5 V is applied from the DC power supply 16. Then, a non-reverse input terminal (+) of an operational amplifier 64 is connected to a junction between the resistor 61 and the Zener diode 62 via a resistor 63, and grounded via thermal sensor 18. A non-reverse input terminal (−) of the operational amplifier 64 is connected to an output terminal of the operational amplifier 64 via a resistor 66, and grounded via a resistor 65. The thermal sensor 18 is formed of, for example, a thermistor wherein an inner resistance is changed in accordance with the change of temperature. The output terminal of the operational amplifier 64 is connected to an input terminal VIN of an A/D (analog/digital) converter 67, and an output terminal OUT of the A/D converter 67 and a clock terminal CLK are connected to the I/O port 24. In other words, the operational amplifier 64 amplifies the non-reverse input voltage which is determined depending on the resistance value of thermal sensor 18, and the A/D converter 67 converts the analog output signal of the operational amplifier 64 into digital data at clock cycles. This digital data indicates the environmental temperature of the photosensitive drum 2 and is supplied to the microprocessor 21 via I/O port 24.

The printing operation of the above-structured printing apparatus will be explained.

When the printing operation is started, the photosensitive drum 2 rotates in the clockwise direction, and exposing unit 5, developing unit 6, transferring unit 7, cleaning device 9, and deelectrifying device 10. The electrifying unit 4 evenly electrifies the surface of the photosensitive drum 2. The electrified surface of the photosensitive drum 2 is scanned by light radiated from EEH 52 of exposing unit 5. The light selectively exposes the surface of the photosensitive drum 2, thereby forming an electrostatic latent image. Thereafter, the developing unit 6 feeds toner which adheres to the surface of photosensitive drum 2 in accordance with the electrostatic latent image, thereby making the latent image visible as a toner image. The transferring unit 7 electrifies a sheet of paper and transfers the toner image from the photosensitive drum 2 to the paper sheet by electrostatic attraction. The toner, which is left in the photosensitive surface after the image transfer, is cleaned by the cleaning device 9. Then, the deelectrifying device 10 removes unnecessary charges in order to make the surface ready to be electrified again. On the other hand, the paper sheet is processed by the deelectrifying unit 8 and the fixing unit 13, and transported to the upper surface of the cabinet 1 by the discharge rollers 14A and 14B.

In the above-mentioned operation, the EL output of the EEH 52 and the bias voltage of the developing unit 6 are adjusted in accordance with the environmental temperature of the photosensitive drum 2 measured by the temperature measuring unit 33 in order to maintain the diameter of dots forming the printed image at 85 μm which is a standard value for the printing density of 300 dots/inch.

Figure 7:
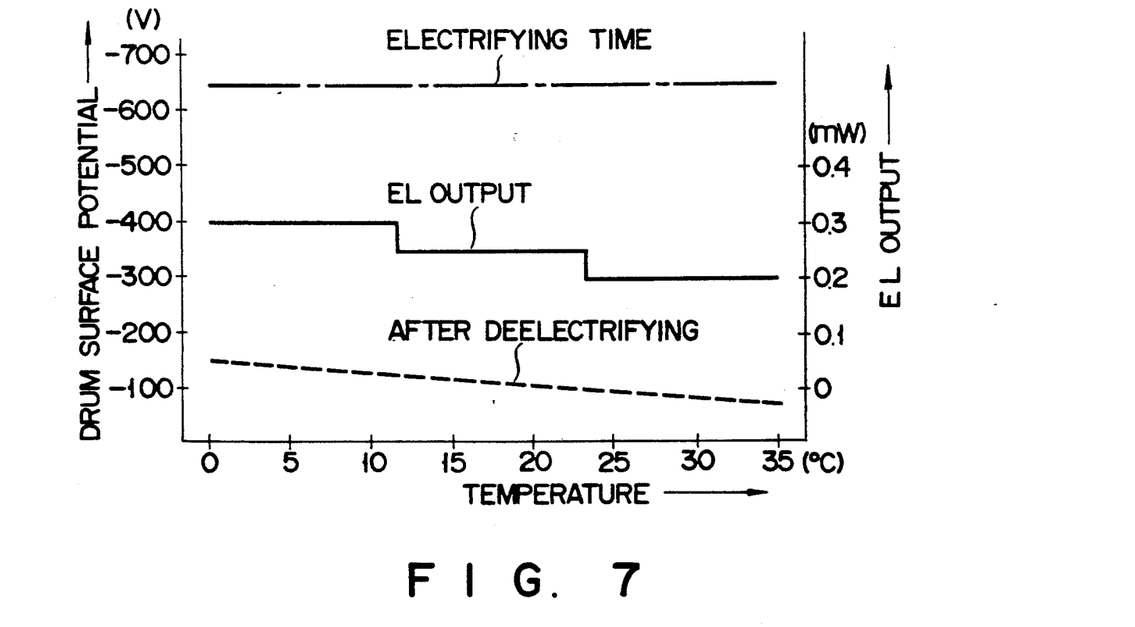
FIG. 7 is a graph showing a relationship among an environmental temperature of a photosensitive drum, a drum surface potential, and an EL output of the EEH.
Figure 8:
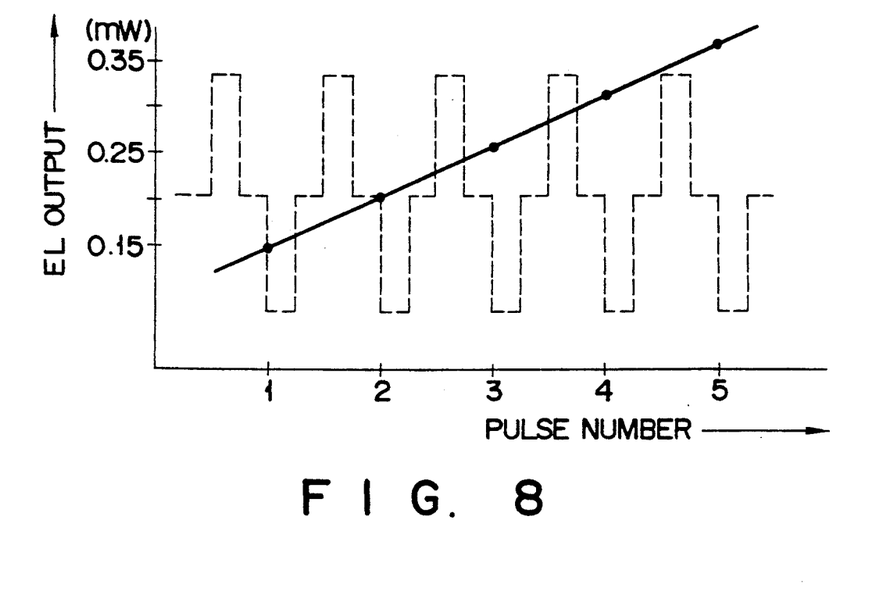
FIG. 8 is a graph showing a relationship between the number of AC voltage pulses generated from a common driver shown in FIG. 3 and the EL output of the EEH.

In FIG. 7, the one dot and dash line represents the surface potential of the photosensitive drum 2 electrified from the no charge state, and the broken line represents the surface potential of the photosensitive drum 2 deelectrified after the image transfer.

The deelectrification efficiency of the photosensitive drum 2 becomes worse as the temperature becomes lower. If the surface potential of the deelectrified photosensitive drum 2 increases due to the change in the deelectrification efficiency, sensitivity of the photosensitive drum 2 is deteriorated. When the printing operation is effected in such a condition, the printed image becomes unclear.

To overcome the above problem, the microprocessor 21 reads data indicating the environmental temperature of the photosensitive drum 2 as measured by thermal sensor 18 prior to the electrification in each printing operation, and detects to which one of first to third temperature ranges the measured temperature belongs. The first range is from 0° C. up to but not including 12° C., the second temperature range is from 12° C. up to but not including 22° C., and the third temperature range is from 22° C. up to but not including 35° C. If the measured temperature does not belong to any one of the first to third temperature ranges, an error process is effected. The microprocessor 21 supplies one of a first to third exposure amount designating data to the exposing control circuit 51. The first designating data is supplied when the measured temperature belongs to the first temperature range, the second designating data is supplied when the measured temperature belongs to the second temperature range, and the third designating data is supplied when the measured temperature belongs to the third temperature range. The exposing control circuit 51 sets the number of AC voltage pulses of the common signal to be supplied from the common driver 54 to the EEH 52. When the first designating data is supplied to the exposing control circuit 51, the number of AC voltage pulses is set to four, thereby causing the EL output to be 0.3 mW. When the second designating data is supplied to the exposing control circuit 51, the number of AC voltage pulses is set to three, thereby causing the EL output to be 0.25 mW. When the third designating data is supplied to the exposing control circuit 51, the number of AC voltage pulses is set to two, thereby causing the EL output to be 0.2 mW. That is, the EL output is more decreased as the temperature range to which the measured temperature belongs is higher, as is shown in the solid line of FIG. 7.

Figure 9:
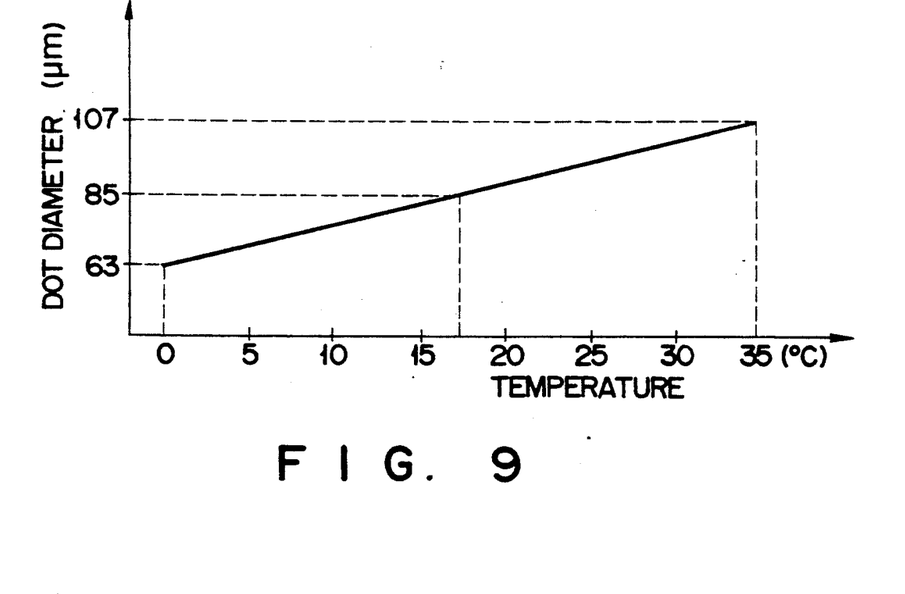
FIG. 9 is a graph showing a relationship between the diameter of dots printed in accordance with light from the EL element and the environmental temperature of the photosensitive member when the EL output of the EEH is kept constant.
Figure 10:
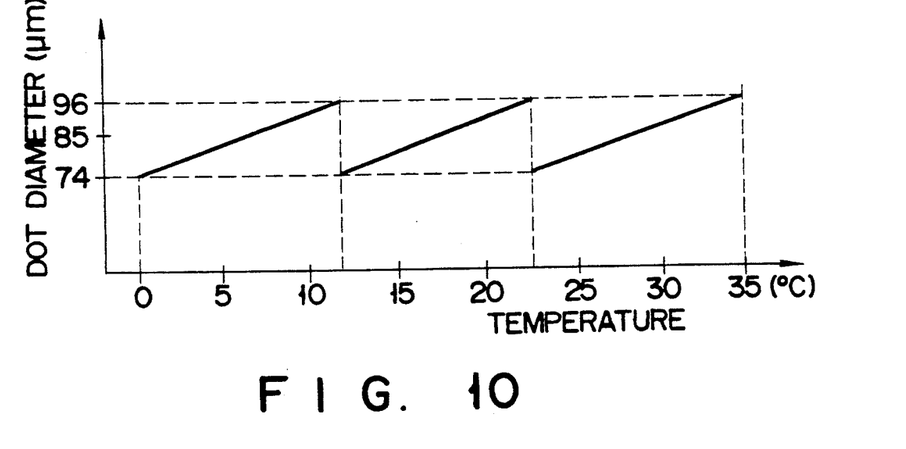
FIG. 10 is a graph showing a relationship between the diameter of dots printed in accordance with light from EEH and the environmental temperature of the photosensitive member when the EL output of the EEH is adjusted.

With the EL elements of this embodiment, dots are printed at 85 μm when the environmental temperature of the photosensitive drum 2 is at 17° C. If the EL output is constant, the diameter of dots is increased by an increase of the environmental temperature and decreased by a decrease of the environmental temperature, as shown in FIG. 9. When the environmental temperature is increased to 35° C. the diameter of dots becomes at 107 μm which is a standard value for the printing density of 237 dots/inch. When the environmental temperature is decreased to 0° C. the diameter of dots becomes at 63 μm which is a standard value for the printing density of 400 dots/inch. However, in this embodiment, the EL output is adjusted to one of 0.3 mW, 0.25 mW, and 0.2 mW. Therefore, the diameter of dots changes within a limited range including 85 μm, as shown in FIG. 10.

Figure 11:
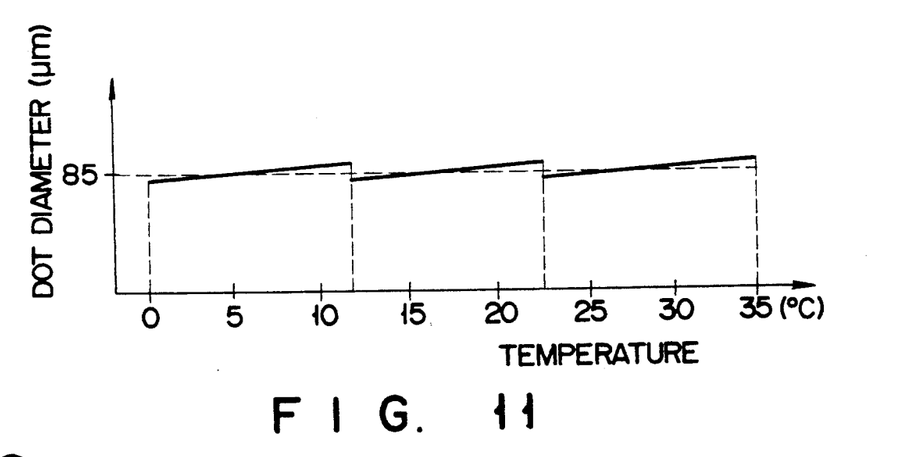
FIG. 11 is a graph showing a relationship between the diameter of dots printed in accordance with light from the EEH and the environmental temperature of the photosensitive member when the amount of feeding developer and the EL output of the EEH are adjusted.
Figure 12:
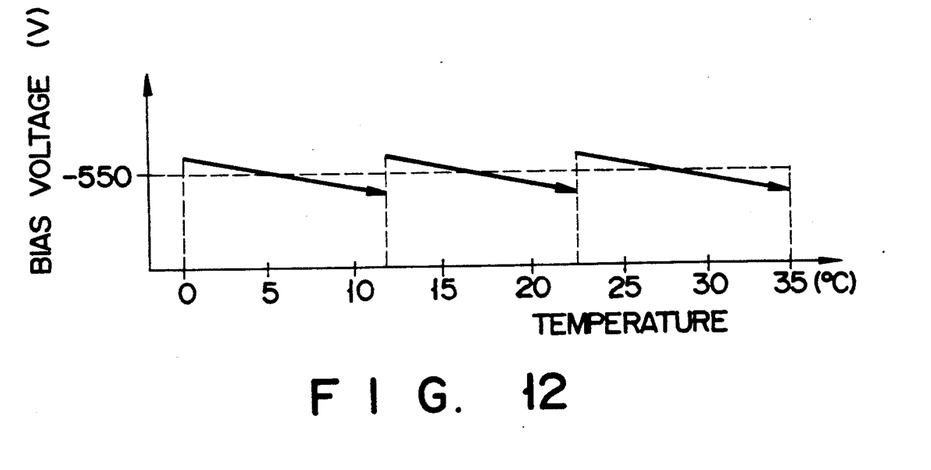
FIG. 12 is a graph showing a relationship between the bias voltage applied to a developing unit and the environmental temperature.

As shown in FIG. 12, the microprocessor 21 further adjusts the bias voltage applied from the high voltage generator 27 to the developing unit 6 such that the amount of feeding toner is more decreased as the measured environmental temperature of the photosensitive drum 2 is higher in each temperature range. This adjustment cancels the change of the diameter of dots which cannot be compensated by the above-mentioned meter of dots substantially at 85 μm as is shown in FIG. 11.

In this embodiment, the diameter of dots is maintained substantially constant by changing the EL output to the three stages, that is, 0.3 mW, 0.25 mW, and 0.2 mW in accordance with the measured temperature. Therefore, it is not necessary to increase the number of stages for changing the EL output.

The present invention is not limited to the above-described embodiment, and can be modified in other various manners without departing from the scope and spirit thereof. In the above-described embodiment, the EL output is changed by changing the number of the AC voltage pulses of common signal to be supplied to the common electrode. It is possible to change the EL output by changing the level of DC voltage pulse of the block signal to be supplied to the block electrode.

Also, in the above-described embodiment, the photosensitive drum was used, but the present invention is, of course, not limited to this type of the photosensitive member.

What is claimed is:

1. An electrophotographic printing apparatus, comprising:
   a photosensitive member;
   electrifying means for electrically charging a surface of the photosensitive member;
   exposing means for selectively exposing the electrically charge surface of said photosensitive member to form an electrostatic latent image;
   developing means for developing the electrostatic latent image by feeding a developer that adheres to the surface of said photosensitive member in accordance with the electrostatic latent image;
   transferring means for electrically charging a sheet of paper to transfer the developed image to the sheet of paper;
   deelectrifying means for discharging a plurality of charges remaining on the surface of said photosensitive member after the developed image has been transferred to the sheet of paper, thereby readying the surface of said photosensitive member for recharging;
   temperature measuring means for measuring an environmental temperature of said photosensitive member; and
   control means including means for detecting a given temperature range among a plurality of continuous temperature ranges within which the measured environmental temperature falls;
   said control means further including:
      means for controlling said exposing means such that an amount of exposure decreases when the detected environmental temperature moves outside the given temperature range and falls within another temperature range having temperatures that are higher than the temperature within said given temperature range; and
      means for controlling the developing means such that an amount of the developer fed to the surface of the photosensitive member is increased and decreased as the measured environmental temperature increases and decreases within the detected temperature range that includes the measured environmental temperature;
   whereby the control of the exposure of the surface of the photosensitive member and the control of the amount of developer fed to the surface of said photosensitive member within each temperature range and from temperature range to temperature range provides a substantially uniform print quality.

2. An electrophotographic printing apparatus according to claim 1, wherein said exposing means includes an array of electroluminescence elements, and driving means for generating drive pulse signals for driving said electroluminescence elements.

3. An electrophotographic printing apparatus according to claim 2, wherein said control means includes exposure amount adjusting means for changing the output level of each electroluminescence element by from said driving means.

4. An electrophotographic printing apparatus according to claim 3, wherein said developing means includes a developing unit for feeding the developer to the surface of said photosensitive member, and voltage generating means for generating a bias voltage for said developing unit.

5. An electrophotographic printing apparatus according to claim 4, wherein said control means includes developer amount adjusting means for changing an amount of developer being fed by changing the bias voltage generated by said voltage generating means.

6. An electrophotographic printing apparatus according to claim 1, wherein said temperature ranges have a substantially identical temperature span, and said developing means includes means for changing the amount of feeding developer in proportion to the change of the measured temperature in each temperature range.

7. An electrophotographic printing apparatus according to claim 1, wherein said control means includes means for receiving data indicating the environmental temperature which is measured by said temperature measuring means prior to the electrification of said photosensitive member before a printing operation.

* * * * *